United States Patent Office 3,455,886
Patented July 15, 1969

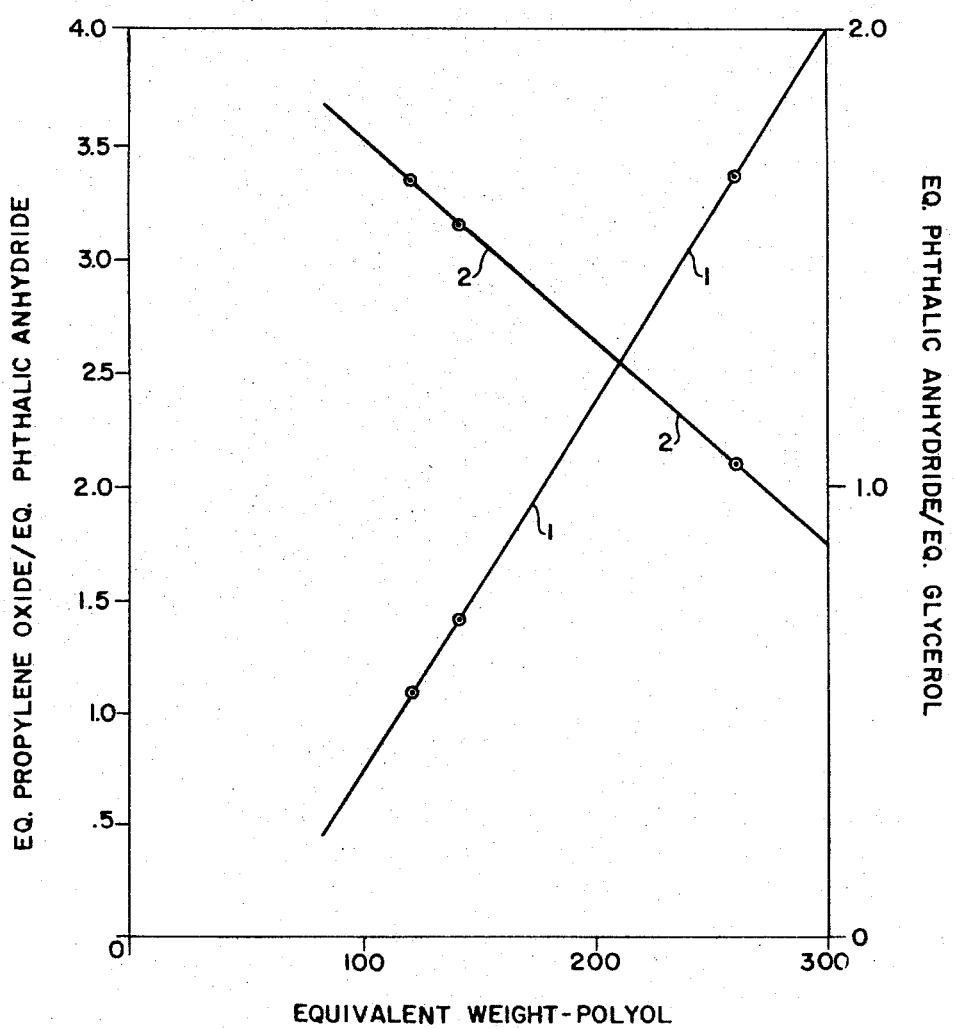

3,455,886
THERMOPLASTIC POLYOLS CONTAINING POLYESTER-ETHER BLOCKS
John Versnel, Plainsboro, N.J., assignor to Columbian Carbon Company, New York, N.Y., a corporation of Delaware
Filed Feb. 18, 1965, Ser. No. 433,660
Int. Cl. C08g 22/14, 23/08
U.S. Cl. 260—78.4        10 Claims

ABSTRACT OF THE DISCLOSURE

Processes are described for the preparation of novel low molecular weight thermoplastic polyether-polyester polyols that are characterized by a narrow molecular weight distribution, relatively low viscosity at room temperature and the presence of polyether and polyester units in blocks. These polyols are prepared by reacting a cyclic ether with the semi-acid reaction product of a polymerization starter having a functionality of at least two and an anhydride of a polycarboxylic acid. Methods are also described for reacting these polyols with organic polyisocyanates and blowing the reaction mixture to produce novel rigid or semi-rigid polyurethane foams.

---

The present invention relates to novel hydroxyl-terminated thermoplastic polymeric materials, i.e., polyols, and more particularly to hydroxyl-terminated polymers which comprise chains containing both ether and ester linkages. In other aspects, the invention relates to methods for producing these novel polyether-polyester polyols, and to improved products, particularly polyurethanes, derived therefrom.

The thermoplastic polyols provided by my present invention differ from the conventional polyether polyols and polyester polyols of the prior art in a number of respects. The most significant difference is that they contain both ester and ether units in a polymer chain. Still another characteristic of my polyols is that the sequence of ester and ether units in a polymer chain is ordered. For example, a typical chain of my polyether-polyester polyol may be represented by:

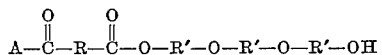

where R represents the residue of an anhydride of a polybasic organic acid, R' represents the residue of a cyclic ether and A represents a structure grouping contained in a polymerization starter molecule and is selected from the group consisting of:

where X is an aliphatic carbon atom; and

where Y is selected from the group consisting of hydrogen and aliphatic and aromatic carbon atoms, and Z is selected from the group consisting of aliphatic and aromatic carbon atoms.

The polyols of the present invention are further characterized by a functionality of at least two, a relatively low viscosity at room temperature and a narrow molecular weight distribution. In general, they have an equivalent weight of from about 80 to 300, and a hydroxyl number of from 187 to 700. Because of these and other properties, they are particularly useful in the manufacture of polyurethanes.

In accordance with my present invention, these useful hydroxyl-terminated polymers containing both ether and ester linkages are produced by reacting an anhydride of an organic polycarboxylic acid with a suitable polymerization starter compound containing at least two radicals selected from the group consisting of alcoholic hydroxyl radicals, primary amine radicals and secondary amine radicals, and combinations thereof, to form a partial-ester or partial-amide, substantially free of unreacted anhydride. This intermediate reaction product is then reacted with an excess, based on the amount of anhydride reacted, of a cyclic ether containing at least one heterocyclic ring comprising one ethereal oxygen atom and at least two carbon atoms to form the polyol.

More particularly, I react the polymerization starter and anhydride reactants in amounts such that the ratio of equivalents of anhydride to equivalents of starter is from 0.1 to 2.0. The conditions of this first stage reaction are such that all or substantially all of the anhydride reacts with the hydroxyl or amine groups of the starter leading to the formation of a partial-ester or partial-amide and generating carboxylic acid groups. This intermediate reaction product is then caused to react with a cyclic ether in an amount of from about 1.5 to about 14 equivalents of anhydride employed in the first stage reaction to form a thermoplastic polyether-polyester polyol.

The starter compounds useful in the practice of the invention contain at least two radicals selected from the group consisting of alcoholic hydroxyl radicals, primary amine radicals, secondary amine radicals, and mixtures thereof, and are free of functional sites other than those specified which are capable of reacting with anhydride under the conditions employed. Advantageously, the functionality of the starter is from 3 to 8.

Representative of the poly-alcoholic hydroxyl starter compounds are ethylene glycol, di-, tri- and tetra-ethylene glycol, trimethylene glycol, di- and tri-propylene glycol, butylene glycol, di- and tri-butylene glycol, 2-butene-1,4-diol, glycerol, trimethylolethane, trimethylolpropane, triethanolamine, pentaerythritol, dipentek, tripentek, sorbitol, annitol, sucrose, glucosides, xylylene glycol, tetramethylol Bisphenol A, etc.

The poly-amine compounds useful in the practice of the invention are aromatic and aliphatic compounds containing at least two primary or secondary amine radicals or combinations thereof, including hexamethylene diamine, ethylenediamine, diaminocyclohexane, 1,3-butylene diamine, phenylene diamine, benzidine, 4,4'-diamino-2,3'-dimethylbiphenyl, triaminopropane, 1,3,5-benzene triamine, triaminotoluene, p-leucoaniline (p,p',p''-triaminotriphenylmethane), tetra-amino - 3,3'-dimethyl-diphenylmethane, diethylenetriamine, triethylenetetramine, 1,3,5,7-heptane tetramine, tetraethylenepentamine, N,N' - dimethyl-p-phenylenediamine, etc.

Compounds containing both alcoholic hydroxyl and primary and/or secondary amine radicals, i.e., alkylolamines, may also be employed, including ethanolamine, dimethanol amine, methanol-ethanol amine, diethanolamine, propanolamine, iso-propanolamine, glycerylamine, butanolamine, N-methyl ethanolamine, N-cyclohexyl propanolamine - 1,3,N-hydroxyethylaniline and tris(hydroxymethyl) aminomethane.

Mixed starter systems comprising two or more polyalcoholic hydroxyl compounds, polyamine compounds, alkylolamine compounds or mixtures thereof, may also be employed with advantage.

The anhydrides useful in the practice of the invention are anhydrides derived from aromatic and saturated and unsaturated aliphatic and cycloaliphatic polybasic acids containing from 2 to 14 carbon atoms, exclusive of the carboxylic carbon atoms, and are free of other functional sites capable of reacting under the conditions employed.

The cyclic monoanhydrides are particularly preferred. Exemplary of these compounds are phthalic anhydride, naphthalene dicarboxylic anhydrides, tetrahydrophthalic anhydrides, endo-cis-bicyclo-(2,2,1)-5-heptene-2,3-dicarboxylic anhydride, 3,6-methylene-cyclohexene-4,5-dicarboxylic anhydride, maleic anhydride, succinic anhydride, glutaric anhydride, octenyl succinic anhydride, diphenic anhydride and mixtures thereof.

Other anhydrides derived from dibasic organic acids may also be used, including adipic anhydride and pimelic anhydride, as may mono-anhydrides derived from tribasic organic acids, e.g. mellitic anhydride.

The use of a halogen-containing anhydride, for instance, tetrachlorophthalic anhydride and 1,4,5,6,7,7-hexachlorobicyclo-(2,2,1)-5-heptene-2,3-dicarboxylic anhydride, is also within the scope of the invention, and leads to a halogen-containing polyether-polyester polyol especially useful in the manufacture of self-extinguishing polyurethane foams. It should be noted that these halogen-containing polyols may be produced by my process without the expected accompaniment of high exotherms and pressures. Furthermore, my process enables the production of low equivalent weight (e.g. 150) polyols containing a sufficient concentration of halogen to impart commercially acceptable self-extinguishing properties to the resultant polyurethane foam.

Cyclic dianhydrides, i.e., anhydrides derived from tetracarboxylic acids may also be used, either alone or in conjunction with monoanhydrides, to provide slightly branched-chain polyether-polyester polyol products. Representative of these compounds are pyromellitic dianhydride, prehnitic dianhydride, and mixtures thereof. If a dianhydride is employed, it is important that it be used in an amount below the value of $\alpha_{crit.}$ in the formula:

$$\alpha_{crit.} = \frac{1}{f-1}$$

where $f$ is the functionality of the starter system and $\alpha_{crit.}$ represents the equivalents of dianhydride per equivalent of starter which will cause the polymer to gel. Thus, for example, if the starter system has an average functionality of 5, $\alpha_{crit.}$ would be 0.25. In this case, less than 0.25 equivalent of dianhydride per equivalent of starter should be used in order to produce the thermoplastic polyols contemplated by the present invention, since a greater amount of dianhydride would result in an infusible, thermosetting gel.

Cyclic ethers useful in the practice of the present invention contain at least one heterocyclic ring of one ethereal oxygen atom and from two to five carbon atoms, and are free of other functional sites capable of reacting under the conditions employed. The monoepoxides are particularly preferred. Exemplary of these compounds are ethylene oxide, propylene oxide, butylene oxide, 1,2-hexylene oxide, styrene oxide, glycidyl methacrylate, and mixtures thereof. Epichlorohydrin is also useful, particularly in the production of polyols to be employed in the manufacture of self-extinguishing polyurethane foams.

Cyclic ethers containing oxygen in a four to six member heterocyclic ring are also useful. Representative of these compounds are trimethylene oxide, tetrahydrofuran, tetrahydropyran, etc.

Diepoxides may also be used either alone or in conjunction with monoepoxides to produce somewhat branched polymers having useful properties. However, the use of a diepoxide requires that the anhydride reactant be a saturated monoanhydride. Furthermore, the amounts of diepoxide used must be below the value of $\alpha_{crit.}$ (equivalents of diepoxide/equivalent of starter) in the previously-noted formula in order to produce the thermoplastic polyols of the present invention. Exemplary of the diepoxides are dicyclopentadiene dioxide, butadiene dioxide, bis-(1,2-epoxypropoxy)4,4-diphenylmethane, and mixtures thereof.

In carrying out the first stage of my process, the anhydride is mixed with a suitable poly-alcoholic hydroxyl, poly-amine or alkylolamine starter compound in an amount such that the equivalents ratio of anhydride to starter is from 0.1 to 2.0. The reactants are heated to a temperature below about 200° C. to cleave the anhydride group and cause its reaction with the starter, thereby linking the anhydride residue to the starter through an ester or amide group, depending upon the functional radical of the starter, and generating a carboxylic acid group.

Depending upon the particular reactants employed, a reaction temperature of from about 80° to about 150° C. is generally required for cleavage of the anhydride group and formation of the partial ester or partial amide. Temperatures above 200° C. for an extended period of time, e.g., two minutes, are to be avoided, since they lead to an undesirable condensation reaction between carboxylic acid groups and functional radicals of the starter, resulting in the generation of water.

The resultant partial ester or partial amide, which is substantially free of unreacted anhydride, is then reacted with from 1.5 to 14 equivalents of cyclic ether per equivalent of anhydride originally employed. Preferably, from about 2 to 8 equivalents of cyclic ether are employed per equivalent of anhydride reacted.

The cyclic ether may be added to the first stage reaction product as rapidly as desired, provided that the reaction exotherm does not rise above 200° C. for an extended period of time. Desirably, the cyclic ether is added relatively slowly, since in this way the reaction exotherm may be controlled. In general, it is preferred to maintain the reaction mixture under pressure and at a temperature of from about 60° to 160° C. when the cyclic ether is being added thereto.

Under these conditions the cyclic ether ring is cleaved, thereby forming an ester linkage by reaction with a carboxyl group of the first stage reaction product and generating a hydroxyl group. The hydroxyl group subsequently reacts with additional cyclic ether leading to the formation of an ether linkage and generating another hydroxyl group, which in turn may react with additional cyclic ether. The reaction proceeds in this manner until all of the cyclic ether has reacted.

Reaction will also occur between cyclic ether and functional group on the starter not previously reacted with anhydride. For example, the cyclic ether will react with a free hydroxy group on the starter to form an ether linkage and generate a hydroxyl group, which in turn can react with additional cyclic ether to form an ether linkage and generate another hydroxyl group. Cyclic ether can also react with a N-substitute amine group on the starter to form a N,N-substituted amine and generate a hydroxyl group, which is free to react in the above-described manner. Furthermore, the cyclic ether can react with a free primary amine group to form an N,N-substituted amine and generate two free hydroxyl groups.

The process of the present invention provides a thermoplastic polymer containing both ether and ester units, and having at least two essentially linear hydroxyl-terminated polymer chains joined to a polymerization starter molecule. Moreover, the ether and ester units are arranged in an ordered sequence in the polymer chains, i.e., ester units are not formed in the polymer chains between ether units and vice versa. The average number of ether and ester units per equivalent of polymerization starter may be represented by the formula:

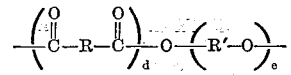

where R is the residue of an anhydride derived from an organic polybasic acid containing from 2 to 14 carbon atoms exclusive of the carboxylic carbon atoms; R' is the residue of a cyclic ether containing at least one heterocyclic ring of one ethereal oxygen atom and from two to five carbon atoms; $d$ is from 0.05 to 1; $e$ is from 0.3 to 2.1 and the ratio of $e$ to $d$ is from 1.5 to 14.

Hydroxyl-terminated polymers in which $d$ is from 0.1 to 0.35, $e$ is from 0.75 to 1.5 and the ratio of $e$ to $d$ is from 2 to 8 are especially advantageous in the manufacture of rigid polyurethane foams.

Particularly desirable polyols produced in accordance with the invention have from 3 to 8 polymer chains joined to the polymerization starter molecule. Furthermore, R is preferably a residue of a cyclic monoanhydride and R' is preferably a residue of monoepoxide.

The polyether-polyester polyols of the present invention are especially suitable for use in the manufacture of polyurethane foams, particularly rigid or semi-rigid foams. However, they also find use in other applications, for instance, as plasticizers. Furthermore, polyols containing vinyl aromatic unsaturation may be cured with vinyl aromatic compounds, for example, styrene, to form useful casting resins.

In preparing a polyurethane foam, the polyether-polyester polyol is reacted with a suitable amount of an organic polyisocyanate in accordance with well-known procedures. For example, the polyol and polyisocyanate, along with a suitable blowing agent, catalyst and surfactant may be brought together simultaneously by the so-called "one shot" technique. Alternatively, the polyol may be reacted with polyisocyanate to form a prepolymer or a quasi-prepolymer which may be subsequently cross-linked by known means to provide the polyurethane foam.

The polyisocyanates useful in the preparation of the polyurethane foams are those conventionally employed for this purpose, and include toluene diisocyanates, polymethylene polyphenylisocyanate, chlorophenylene diisocyanates, diphenylmethane-4,4'-diisocyanate, naphthalene-1,5-diisocyanate, hexamethylene diisocyanate and dimers and trimers of isocyanates and diisocyanates.

The amount of polyisocyanate employed should desirably be at least the amount theoretically required to react with the polyether-polyester polyol. Best results are obtained when the polyisocyanate is employed in a 3% to 5% stoichiometric excess.

The invention will now be further described with reference to the following illustrative and non-limitative examples.

Examples 1–3

Examples 1–3 illustrate the preparation of polyether-polyester polyols of various equivalent weights from glycerol, phthalic anhydride and propylene oxide reactants. In each of the examples, glycerol and phthalic anhydride were charged to a one gallon 316 stainless steel autoclave in the amounts set forth below. The mixture was heated to a temperature of about 130° C. to react all of the phthalic anhydride present with the glycerol and form the half-ester.

Thereafter, propylene oxide, in the amount set forth below, was added at a metered rate to the half-ester to form the polyether-polyester polyol product. The rate at which the propylene oxide was added was below that at which the reaction temperature would be caused to rise above 160° C.

The quantities of reactants, in equivalents, and the equivalent weights of the resultant polyols are tabulated in Table 1 and plotted in FIGURE 1.

Referring to FIGURE 1, the straight lines 1 and 2 obtained by plotting polyol equivalent weight versus phthalic anhydride/glycerol equivalents ratio and propylene oxide/phthalic anhydride equivalents ratio, respectively, indicate that substantially all of the phthalic anhydride reacted with glycerol to form the half-ester. That is to say, there was substantially no unreacted phthalic anhydride present in the reaction mixture at the time propylene oxide addition was commenced. If unreacted anhydride was present in the reaction mixture during propylene oxide addition, additional ester linkages would be formed in the growing polymer chain by reaction of the anhydride with hydroxyl groups generated upon cleavage of the epoxide, and the ordered sequence polyether-polyester polyols contemplated by the present invention would not be obtained.

Furthermore, because of the linearity of the plots, the relative amounts of glycerol, phthalic anhydride and propylene oxide required to produce a polyol of an equivalent weight up to about 300 can be reliably predicted.

It will also be noted from FIG. 1, that as the phthalic anhydride/glycerol equivalent ratio is increased and the propylene oxide/phthalic anhydride ratio is decreased, the equivalent weight of the polyol increases, and vice versa.

Example 4

This example illustrates the preparation of a chlorine-containing polyol suitable for use in the manufacture of self-extinguishing polyurethane foams. Tetrachlorophthalic anhydride, in an amount of 1720 grams (12.1 equivalents) was caused to react with 460 grams of glycerol (15 equivalents) at a temperature between 130° C. to 140° C. The resultant half-ester, free of unreacted anhydride, was cooled to 126° C., and 950 grams of propylene oxide (32.8 equivalents) was slowly added thereto over a period of 45 minutes.

The resultant polyol had the following properties:

TABLE 2

| | |
|---|---|
| Functionality | 3 |
| Equivalent wt. | 200 |
| Acid number | 0.02 |
| Hydroxyl number | 293 |
| Percent chlorine by weight | 27.4 |
| Brookfield viscosity @ 22.9° C. cps | 645,000 |

Example 5

This example illustrates the preparation of a low equivalent weight, high chlorine content polyether-polyester polyol which may be used with particular advantage in the manufacture of self-extinguishing polyurethane foams. To a one-gallon autoclave were added 1005 grams (22.5 equivalents) of trimethylolpropane and 1540 grams (8.3 equivalents) of 1,4,5,6,7,7-hexachlorobicyclo-(2,2,1)-5-heptene-2, 3-dicarboxylic anhydride. The mixture was heated to 139° C. over a period of 130 minutes to cause complete reaction of the anhydride to form the half-ester thereof. Thereafter, propylene oxide was added to the reaction mixture. Reaction temperature was maintained below 160° C. and pressure below 90 p.s.i. during the propylene oxide addition. When the addition of propylene oxide caused the reaction temperature to drop, instead of the usual exotherm, the reaction was completed. The reaction was continued for an additional 40

TABLE 1

| Example | Glycerol (eq.) | Phthalic anhydride (eq.) | Propylene oxide (eq.) | Eq. phthalic anhydride per eq. glycerol | Eq. propylene oxide per eq. phthalic anhydride | Equivalent weight of polyol |
|---|---|---|---|---|---|---|
| 1 | 23 | 12.5 | 42.0 | 0.544 | 3.36 | 123 |
| 2 | 23 | 16.1 | 48.5 | 0.700 | 3.15 | 143 |
| 3 | 12 | 20.3 | 43.0 | 1.69 | 2.12 | 260 | minutes at 140° C. The polyol had the following properties:

TABLE 3

| | |
|---|---|
| Functionality | 3 |
| Equivalent wt. | 155 |
| Acid number | 0.2 |
| Hydroxyl number | 363 |
| Percent chlorine by weight | 24.4 |
| Brookfield viscosity @ 23.6° C. cps | 60,000 |

Examples 6–8

These examples illustrate the preparation of polyether-polyester polyols using a mixed sucrose-glycerol polymerization starter system. In each of the examples, glycerol, sucrose and phthalic anhydride in the amounts noted in Table 4, below, were caused to react at a temperature of about 130° C. in a one gallon, 316 stainless steel autoclave.

After the half-ester formation was completed, propylene oxide was metered into the reactor at a rate which would not cause the temperature to exceed 160° C. After sufficient propylene oxide had been added, the reaction mixture was maintained at 160° C. for an additional 40 to 60 minutes. Excess unreacted propylene oxide was vented prior to removal of the polyol from the reactor.

The quantities of reactants, in equivalents, and the properties of the resultant polyols are set forth in Table 4:

TABLE 4

| Example | 6 | 7 | 8 |
|---|---|---|---|
| Reactants: | | | |
| Glycerol (eq.) | 10.8 | 13.2 | 13.2 |
| Sucrose (eq.) | 7.2 | 8.8 | 8.8 |
| Phthalic anhydride (eq.) | 18.9 | 17.6 | 14.5 |
| Propylene oxide (eq.) | 47.8 | 48.8 | 45.2 |
| Eq. phthalic anhydride per eq. starter (glycerol plus sucrose) | 1.05 | 0.80 | 0.66 |
| Eq. propylene oxide per eq. phthalic anhydride | 2.52 | 2.77 | 3.12 |
| Polyol properties: | | | |
| Equivalent weight | 165 | 137 | 133 |
| Acid number | 1.2 | 2.5 | 0.47 |
| Hydroxyl number | 339 | 406 | 424 |

Example 9

This example illustrates the preparation of a polyether-polyester polyol from triethanolamine, succinic anhydride and propylene oxide. Succinic anhydride in the amount of 1000 grams (20 eq.) was first caused to react with 1039 grams of triethanolamine (20.6 eq.) at a temperature of about 100° C. to form a reaction product substantially free of unreacted succinic anhydride. Propylene oxide in the amount of 1113 grams (38.5 eq.) was then added to this reaction product at a rate which maintained temperatures below 160° C. The resultant polyol had the following properties:

TABLE 5

| | |
|---|---|
| Functionality | 3 |
| Equivalent weight | 110 |
| Acid number | 0.5 |
| Hydroxyl number | 510 |

Example 10

This example illustrates the preparation of a polyether-polyester polyol from trimellitic anhydride, ethylene glycol and propylene oxide. Ethylene glycol (414 g.; 13.4 eq.) was caused to react with trimellitic anhydride (1320 g.; 20.0 eq.) at a temperature of about 125° C. to form a half-ester reaction product. Thereafter, propylene oxide (2125 g.; 73.5 equivalents) was slowly added to the reaction mixture, the temperature of reaction being maintained below 160° C. and the pressure at less than 130 p.s.i. Once the pressure remained constant, the reaction was terminated. The polyol had the following properties:

TABLE 6

| | |
|---|---|
| Functionality | 3 |
| Equivalent weight | 150 |
| Acid number | 4.7 |
| Hydroxyl number | 369 |
| Brookfield viscosity @ 100° C. cps | 80 |

Example 11

This example illustrates the preparation of a polyether polyester polyol from ethylene glycol, trimellitic anhydride and epichlorohydrin. Ethylene glycol (414 g.; 13.4 eq.) and trimellitic anhydride (1320 g.; 20 eq.) were reacted together at a temperature of about 125° C. to form a half-ester reaction product. Epichlorohydrin (2340 g.; 50.6 eq.) was slowly added to the reaction mixture at a rate which did not cause the reaction temperature to rise above about 160° C. The polyol was found to have the following properties:

TABLE 7

| | |
|---|---|
| Functionality | 3 |
| Equivalent weight | 203 |
| Acid number | 5.2 |
| Hydroxyl number | 272 |
| Percent chlorine (by weight) | 22 |

Due to its high chlorine content this polyol could be used, with advantage, in the manufacture of self-extinguishing polyurethane foams.

Examples 12–15

These examples illustrate the preparation of rigid polyurethane foams by a conventional one-shot technique from the polyether-polyester polyols prepared in accordance with foregoing Examples 2, 4, 5 and 7, respectively.

In each example, the polyether-polyester polyol was charged to a suitable container and mixed with a stabilized trichlorofluoromethane blowing agent (marketed as "Freon 11–B" by E. I. du Pont de Nemours & Company, Inc.), N,N,N',N'-tetramethyl-1,3-butanediamine and a silicone-glycol copolymer surfactant (marketed as "Dow Corning 113" by Dow Corning Corp.) to form a homogenous mixture. Polymethylene polyphenylisocyanate (marketed under the trademark "PAPI" by The Carwin Company) was added to the homogenous mixture under agitation supplied by a two inch, high lift stirrer operated at 2500 r.p.m.

The resultant mixture was then poured into a suitable mold and was allowed to rise. The foam formulations and foam properties are set forth in Table 8:

TABLE 8

| Example No. | 12 | 13 | 14 | 15 |
|---|---|---|---|---|
| Polyol prep. (example) | 2 | 4 | 5 | 7 |
| Foam formulation (grams): | | | | |
| Polyol | 300 | 300 | 300 | 300 |
| Trichlorofluoromethane | 93 | 80 | 95 | 95 |
| N,N,N',N'-tetramethyl-1,3-butanediamine | 3.0 | 3.0 | 3.0 | 3.0 |
| Silicon-glycol copolymer surfactant | 5.0 | 10.0 | 10.0 | 5.0 |
| Polymethylene Polyphenyl-isocyanate (eq. wt. 132) | 282 | 206 | 294 | 298 |
| Foam properties: | | | | |
| Mixing time (seconds) | 15 | 18 | 19 | 15 |
| Cream time (seconds) | 20 | Immediate | 3 | 15 |
| Rise time (seconds) | 60 | 74 | 63 | 125 |
| Tack free time (seconds) | Immediate | Immediate | Immediate | Immediate |
| Foam density (lb./cu. ft.) | 1.74 | 1.75 | 1.62 | 1.75 |
| Compressive strength (p.s.i.) at yield (percent) | 37.0 at 6.1 | 24.1 at 4.1 | 22.6 at 3.6 | 29.9 at 5.2 |

It can be readily seen from the above data that rigid polyurethane foams derived from the polyol products of the present invention are characterized by excellent compressive strengths.

The polyurethane foams of Examples 13 and 14, which were derived from chlorine containing polyether-polyester polyols, were further tested for their self-extinguishing characteristics according to ASTM D–1692–59T, and were found to be excellent in this respect.

I claim:

1. Method for separately adding a carboxylic acid anhydride and a cyclic ether to a polymerization starter to produce a thermoplastic polyol addition polymer in which substantially all of the carboxylic acid anhydride is directly bonded to the starter comprising:
   (A) reacting, in a polymerization zone at a temperature below about 200° C., an organic polymerization starter having a functionality of at least two and containing functional groups selected from the group consisting of hydroxy, primary amino and secondary amino radicals and combinations thereof with from about 0.1 to about 2.0 equivalents per equivalent of said starter of an anhydride of an organic polycarboxylic acid containing from about 2 to about 14 carbon atoms exclusive of the carboxylic carbon atoms,
   (B) continuing said reaction until substantially all of said anhydride has added to said starter to form a semi-acid before introducing any cyclic ether into said polymerization zone and then
   (C) introducing into said polymerization zone at least about 1.5 equivalents per equivalent of said anhydride of a cyclic ether containing at least one heterocyclic ring comprising an oxygen atom and at least two carbon atoms and reacting said semi-acid and ether at a temperature below about 200° C.

2. Method as in claim 1 wherein said organic starter compound contains from 3 to 8 of said radicals.

3. Method as in claim 1 wherein said anhydride is a cyclic monoanhydride.

4. Method as in claim 1 wherein said cyclic ether is a monoepoxide.

5. Method as in claim 1. wherein said organic starter compound is a polyhydric alcohol.

6. Method as in claim 1 wherein the reaction product of the anhydride and the starter is subsequently reacted with from 2 to 8 equivalents of cyclic ether per equivalent of anhydride originally reacted.

7. The method of claim 1 wherein said organic starter compound is a polyamine.

8. The method of claim 4 wherein said cyclic ether is a lower alkylene oxide.

9. The thermoplastic polyol product of claim 1.

10. A thermoplastic polyol product of the addition polymerization of a carboxylic acid anhydride, a cyclic ether and a polyhydric alcohol in which substantially all of the carboxylic acid anhydride is directly bonded to the polyhydric alcohol, said polyol product being produced by:
   (A) heating, in a polymerization zone at a temperature of from about 80° C. to about 150° C., a polyhydric alcohol having a functionality of from about three to about eight, the hydroxy groups of said alcohol being the only functional sites capable of reacting with anhydride under the reaction conditions employed, with from about 0.2 to about 0.7 equivalent per equivalent of said polyhydric alcohol of a monoanhydride of a carbocyclic dicarboxylic acid containing from about two to about fourteen carbon atoms exclusive of the carboxyl carbon atoms,
   (B) continuing said heating until substantially all of said anhydride has added to said polyhydric alcohol to form a semi-aci before introducing any cyclic ether into said polymerization zone and then
   (C) introducing into said polymerization zone from about two to about eight equivalents per equivalent of said anhydride of a monoepoxide and reacting said semi-acid and monoepoxide at a temperature of from about 60° C. to about 160° C.

References Cited

UNITED STATES PATENTS 3,089,863   5/1963   Hicks et al.

JOSEPH L. SCHOFER, Primary Examiner

J. KIGHT III, Assistant Examiner

U.S. Cl. X.R.

260—2.5, 75, 78.5